United States Patent Office 3,407,049
Patented Oct. 22, 1968

3,407,049
SUPERCONDUCTING ARTICLES AND METHOD
OF MANUFACTURE
Donald C. Freeman, Jr., Tonawanda, N.Y., and Milton C.
Otto, Indianapolis, Ind., assignors to Union Carbide
Corporation, a corporation of New York
Filed May 17, 1965, Ser. No. 456,412
7 Claims. (Cl. 29—183)

ABSTRACT OF THE DISCLOSURE

A superconducting article having a lamellar structure of microscopic metallic particles bonded into interlocking relation with one another with the interface between bonded particles forming continuous filaments of metallic material having superconducting properties. The superconducting article is formed by depositing suitable metallic material in powdered form into a high velocity, high temperature gas stream being directed against the surface of a suitable base and heat treating the bonded particles.

---

This invention relates to superconducting devices and their method of manufacture. More particularly, this invention relates to superconducting articles produced from suitable metallic powders.

Until this invention there existed two practical methods of forming superconducting articles from metal powders. One method is to compact powders of superconducting metal into simple geometric forms, such as cylinders, and sinter the compacted powder to obtain a free-standing structure. This method is limited to producing such simple geometries as cylinders, however, because of the difficulty attendant satisfactorily compressing powders into more complicated structures. The utility of pressed and sintered articles is also limited because many superconducting metals, particularly $\beta$-tungsten structure intermetallic compounds, are so brittle as to preclude machining into more complicated geometries.

A second method, developed to produce wires from such brittle superconducting metals as the $\beta$-tungsten intermetallic compounds which otherwise could not be produced in wire form, is to clad elemental powders, for example in a thin steel tube, and draw the cladded structure into a fine wire whereupon the powders are reacted to form the desired superconducting intermetallic compound. This method is limited to producing thin wires for use in devices such as superconducting solenoids.

A principal object of this invention is to provide superconducting devices of various geometries formed from suitable metallic powders. Another object is to provide such devices in an easily machinable form. A further object is to provide a method of fabricating such devices from suitable metal powders.

These and other objects and advantages will become apparent from the following description and the accompanying drawings which show magnetization curves plotting critical current density vs. magnetic field which exemplify the superconducting properties of devices fabricated in accordance with this invention.

According to this invention, a superconducting device may be fabricated by introducing a suitable powdered metallic material into a high velocity, high temperature gas stream to produce a high velocity stream of heated particles which are at least partially molten and directing this high velocity stream against the surface of a suitable base thereby depositing the so-heated particles on the base. The layer formed in this manner has a generally lamellar structure of microscopic metallic particles bonded into interlocking relation with one another with continuous superconducting interfacial filaments between the bonded particles. The lamellar structure may be heat treated at a suitable temperature for a suitable period of time to enhance the formation of these superconducting interfacial filaments between the bonded particles.

Suitable metallic powders include metals or metal alloys which have superconductive properties or which combine to form an alloy having superconductive properties. Typical metals, which are listed herein by way of a non-limiting example, include niobium, tin, zirconium, aluminum, vanadium, silicon. Niobium is superconducting in its pure form, when present in alloys such as the intermetallic compounds of niobium tin ($Nb_3Sn$) and niobium aluminum ($Nb_3Al$), and also when present in alloys such as the solid solution of niobium and zirconium. Vanadium is superconducting when present in alloys such as the intermetallic compound of vanadium silicide ($V_3Si$).

The optimum powder size is that which permits the particles to be softened enough to give good adherence but does not permit excessive vaporization of the particles. Generally, materials of lower melting point may be of larger particle size, up to 150 microns for example, and those materials of higher melting point may be smaller than about 50 microns. However, these size limits are not critical.

The process by which the high temperature, high velocity gas stream is produced must be capable of transferring a sufficient amount of energy to the powder to be deposited to insure the formation of a sound, dense, adherent layer on the surface of the base material.

A preferred process is to strike an electric arc between two electrodes and pass a gas stream into the arc to produce a high thermal content plasma. The powder is introduced into this plasma to heat and propel the powder onto a base. It is further preferred that a portion of the arc and at least some of the gas be passed through an orifice to constrict the arc so as to produce an intense columnar arc-containing plasma. It is also preferred that the process employ a nontransferred arc wherein the base is not in the electrical circuit.

Another process that may be employed is to detonate a fuel charge in a confined chamber and simultaneously introduce the powder into the chamber in such manner that the powder particles are heated and propelled from the chamber by the detonation onto a base. This process could be employed, for example, in producing lamellar structures containing one of the superconducting niobium oxynitride compounds.

Many gases can be employed in this process depending upon the type of material being deposited. Relatively pure coatings may be achieved by employing an atmosphere inert both to the coating material and the base, such as argon, helium, and in some circumstances, nitrogen and hydrogen. Mixtures of gases, such as argon-nitrogen and argon-hydrogen, can also be employed. The advantage of employing an arc to transfer thermal energy to the powder is that the chemistry of the ambient atmosphere can be controlled without basically affecting the energy available for heating the coating material.

A suitable base material upon which heated particles may be deposited can be any material to which the particles will adhere. For certain devices, the base material will preferably be removed by, for example, dissolution and for such devices the base material must be soluble in a solvent that will not attack the coating. The base material to which the coating of this invention is to be applied may be of any material which is solid and chemically stable at application temperatures. During the application of the coating of this invention the temperature of the base material may be raised to as high as approximately 600° F. Therefore, to prevent alloying of the coating and base materials, the base material would have to be a solid having a melting point higher than approximately 600° F. External cooling during deposition, or internal cooling if the base is hollow, can be used to maintain the base at a suitably low temperature in which case a lower melting point material might be used.

In order to insure that a metallic material will carry a superconductive current when cooled below its transition temperature, the internal structure of the superconductor must contain a continuous path of superconducting material. If grain boundary film or gross inclusions are present to a significant degree, the superconductive electrical continuity will be disrupted. The electric arc plating process referred to above produces a pure layer or coating, or at least the distribution of impurities is such that the electrical continuity is not appreciably affected, and for this reason the arc plating process is the preferred process for producing superconducting devices of this invention.

Powdered metallic materials such as described above can be introduced into the high velocity, high temperature gas stream in elemental form such that each of the microscopic particles of the thus-formed lamellar structure will be constituted of elemental material randomly dispersed within the coating structure. Alternately, elemental powdered materials can be prereacted to form an alloyed powdered material prior to introduction into the gas stream such that the thus-formed microscopic leaves of the lamellar structure will be constituted of alloyed material. An alloyed powdered material is obtained by blending elemental powders, sintering or reacting the blended powders, and then milling the product. When either elemental or prereacted powders are used, the continuous network of filaments formed at the interface of the bonded and interlocking particles will provide the principal superconducting current path.

Use of elemental powders is preferred because superior superconducting performance is more easily obtained than when prereacted powders are used. The reasons for this superiority are not fully understood but such superiority is believed to be attributable to a better distribution of existing impurities in the powder. With prereacted powders, the original surface film on each elemental particle would be diffused into, or perhaps trapped at interfaces within, the resulting alloyed powder particles during the reaction. Comminution of the reacted product to form new alloyed powder provides new surfaces which become contaminated by a surface film. During deposition of the prereacted powders to form the lamellar structure, the latter surface film would be disrupted by particle surface melting as adjacent particles are bonded together, but internal impurities from the original surface film would likely be unaffected and probably impede formation of the necessary continuous network of interfacial filaments. However, by comminution of the prereacted powder to very fine particles, more complete particle reaction could be promoted during deposition thereby better disrupting the internal surface film impurities and providing improved superconducting performance.

The superconducting performance of the deposited layer or coating can be markedly improved by heat treatment. Furthermore, if the as-deposited coating is not appreciably superconducting, for example as might occur when elemental vanadium and silicon powders are deposited under conditions resulting in little or no formation of the superconducting intermetallic compound $V_3Si$ at the particle interfaces, heat treatment of the coating will result in the coating becoming a good superconductor. In general, heat treatment is a necessary procedure when an intermetallic compound is to be formed from elemental powders that either are not, or not significantly, superconductive because there appears to be insufficient reaction at the particle interfaces upon deposition to consistently achieve a continuous network of interfacial superconducting filaments. When either solid solution alloys or pure metal coatings are produced from elemental powders, heat treatment is not essential but is preferred.

Superconducting articles produced in accordance with the present invention can be formed in geometries and with dimensions unattainable by pressing powders. For example, long thin tubes can be made, and geometries having re-entrant configurations can be produced. Furthermore, the nonhomogeneous nature of the coated lamellar structures produced in accordance with this invention offers a distinct advantage in mechanical properties over pressed and sintered devices. In contrast to the latter, the lamellar coatings of this invention are easily machinable to any desired configuration prior to heat treatment although upon heat treatment such lamellar coatings become more brittle and therefore more difficult to machine. Intermetallic compounds having a β-tungsten structure, for example, are so brittle as to preclude, from a practical standpoint, any machining whatsoever. Thus lamellar coatings of this invention have mechanical properties superior to those produced from a homogeneous material by other techniques such as, for example, pressing and sintering.

Table I lists representative data for several superconducting lamellar coatings prepared in accordance with this invention. The specimens listed are cylindrical approximately ¼ inch I.D. x ¾ inch long with wall thicknesses as listed in the table. The powder feed material was deposited by passage through the collimated plasma of a constricted arc onto brass or aluminum substrates. The substrates were then dissolved so that the specimen could be heat-treated as free-standing cylinders.

TABLE I

| Specimen | Powder Condition [2] | Heat Treatment | | Specimen Wall Thick., in. | Field Excluded,[3] kg. | Field Trapped,[3] kg. |
|---|---|---|---|---|---|---|
| | | Temp., °C. | Time, Hrs. | | | |
| 1, Nb | | (4) | (4) | 0.021 | 3.0 | 4.5 |
| 2, Nb | | 900 | 2 | 0.0205 | 3.0 | 3.5 |
| 3, Nb-25% Zr | Premixed | (4) | (4) | 0.0205 | 2.5 | 4.4 |
| 4, Nb-25% Zr | do | 900 | 2 | 0.024 | 4.0 | 6.8 |
| 5,[1] $Nb_3Al$ | Prereacted | 900 | 1 | 0.11 | 0.1 | 0.2 |
| 6, $Nb_3Al$ | do | (4) | (4) | 0.015 | 0 | 0.5 |
| 7, $Nb_3Al$ | do | 700 | 2 | 0.015 | 0.15 | 0 |
| 8, $Nb_3Al$ | Premixed | 900 | 2 | 0.015 | 3.0 | 5.2 |
| 9, $Nb_3Al$ | do | 1,000 | 6 | 0.100 | 3.0 | 0.8 |
| 10, $Nb_3Al$ | do | 500 | 3 | 0.100 | 6.6 | 6.6 |
| 11,[1] $V_3Si$ | Prereacted | 900 | 1 | 0.095 | 0.2 | 0.6 |
| 12, $V_3Si$ | do | (4) | (4) | 0.0105 | 0 | 0 |
| 13, $V_3Si$ | do | 700 | 24 | 0.008 | 0.75 | 0.5 |
| 14, $V_3Si$ | do | (4) | (4) | 0.028 | 0 | 0 |
| 15, $V_3Si$ | do | 1,200 | 10 | 0.028 | 2.0 | 4.8 |
| 16, $V_3Si$ | Unmixed | (4) | (4) | 0.030 | 0 | 0 |
| 17, $V_3Si$ | do | 900 | 6 | 0.060 | 26.0 | |
| 18, $V_3Si$ | Premixed | 1,000 | 6 | 0.060 | 24.68 | |
| 19,[1] $Nb_3Sn$ | Prereacted | 1,000 | 6 | 0.095 | 9.8 | 9.8 |
| 20, $Nb_3Sn$ | do | (4) | (4) | 0.003 | 0 | 0 |
| 21, $Nb_3Sn$ | do | 800 | 1 | 0.008 | 0.25 | 0.25 |
| 22, $Nb_3Sn$ | Unmixed | (4) | (4) | 0.025 | 1.2 | 1.4 |
| 23, $Nb_3Sn$ | do | 1,000 | 6 | 0.050 | 45.3 | 41.2 |
| 24, $Nb_3Sn$ | do | 1,000 | 6 | 0.025 | 25.8 | 18.5 |
| 25, $Nb_3Sn$ | Premixed | 1,000 | 6 | 0.050 | 44.7 | |
| 26, NbZrSn | do | 800 | 2 | 0.100 | 10.0 | 9.0 |
| 27, NbZrSn | do | 1,000 | 6 | 0.100 | 10.0 | 8.0 |
| 28, NbZrSn | do | 1,000 | 6 | 0.100 | 13.7 | |

[1] Pressed and sintered cylinders.  [2] Powder Condition.—Premixed-elemental powders uniformly mixed but not reacted before fed into arc effluent. Unmixed-elemental powders separately but simultaneously fed into arc effluent. Prereacted-elemental powders mixed and reacted to form alloy and then ground to form alloy powder which was fed into arc effluent.  [3] These data obtained from hollow cylinder magnetization measurements.  [4] None.

There are three general groupings of lamellar-structured specimen listed in Table I. Specimen 1 and 2 comprise elemental metal cylinders, specimen 3 and 4 comprise solid solution alloy cylinders, specimen 5 to 25 comprise β-tungsten intermetallic compound cylinders, and specimen 26 to 28 comprise ternary alloy cylinders. The flux trapping and flux shielding (exclusion) data in Table I suggest that both elemental and solid solution alloy lamellar-structured layers would be superconducting whether or not heat treated and that heat treatment improves somewhat their superconducting performance. The data also suggest that heat treatment markedly improves the superconducting performance of intermetallic compound lamellar-structured layers made from relatively nonsuperconducting constituents, such as $V_3Si$, and that heat treatment markedly improves the superconducting performance of intermetallic compound lamellar-structured layers made from superconducting constiuents, such as $Nb_3Al$ and $Nb_3Sn$.

The data in Table I further suggests that using unmixed or premixed elemental powders is preferable to using prereacted powder. As discussed previously, use of prereacted powder may introduce deleterious oxide contaminants that reduces the superconducting performance of the coating.

FIGURES 1 to 6 show critical current density values obtained from hollow cylinder magnetization curves for a number of the specimens at 4.2° K. listed in Table I, the curve numbers in the figures corresponding to the specimen numbers in the table. The critical current density vs. magnetic field curves for lamellar structures produced by this invention shown in these figures are merely exemplary and do not depict the upper limit critical state behavior of materials produced in accordance with this invention.

FIGURE 1 shows the critical current behavior for a lamellar-structure containing the pure metal, niobium, as deposited, curve 1, and after the heat treatment specified in Table I, curve 2, compared with typical behavior reported for pressed and sintered niobium cylinders, curve A. Figure 2 shows the critical current behavior for a lamellar structure containing the superconducting solid solution alloy, Nb–25% Zr, after the heat treatment specified in Table I, curve 4, compared with typical behavior reported for pressed and sintered Nb–25% Zr, cylinders, curve B.

Figure 1:
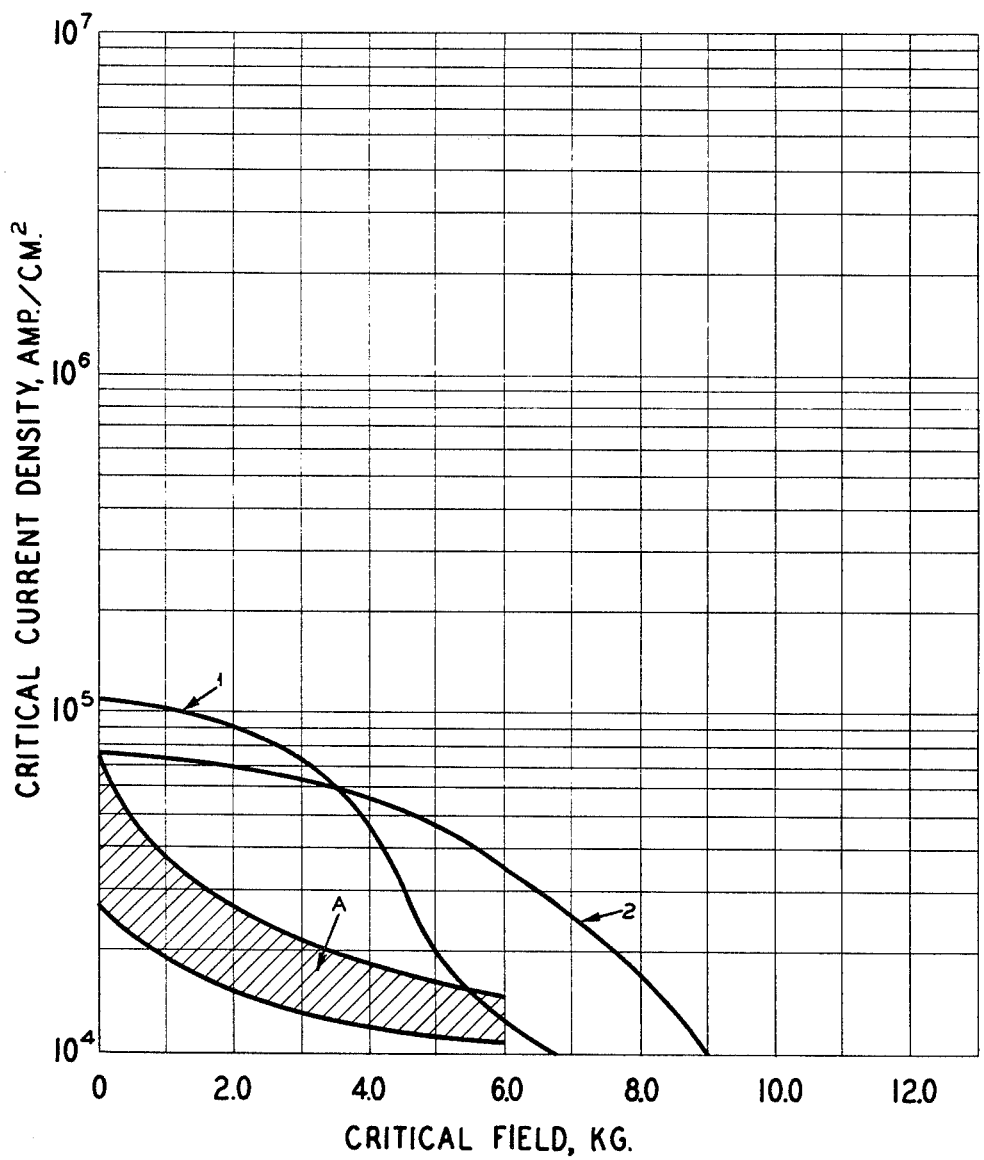
Figure 2:
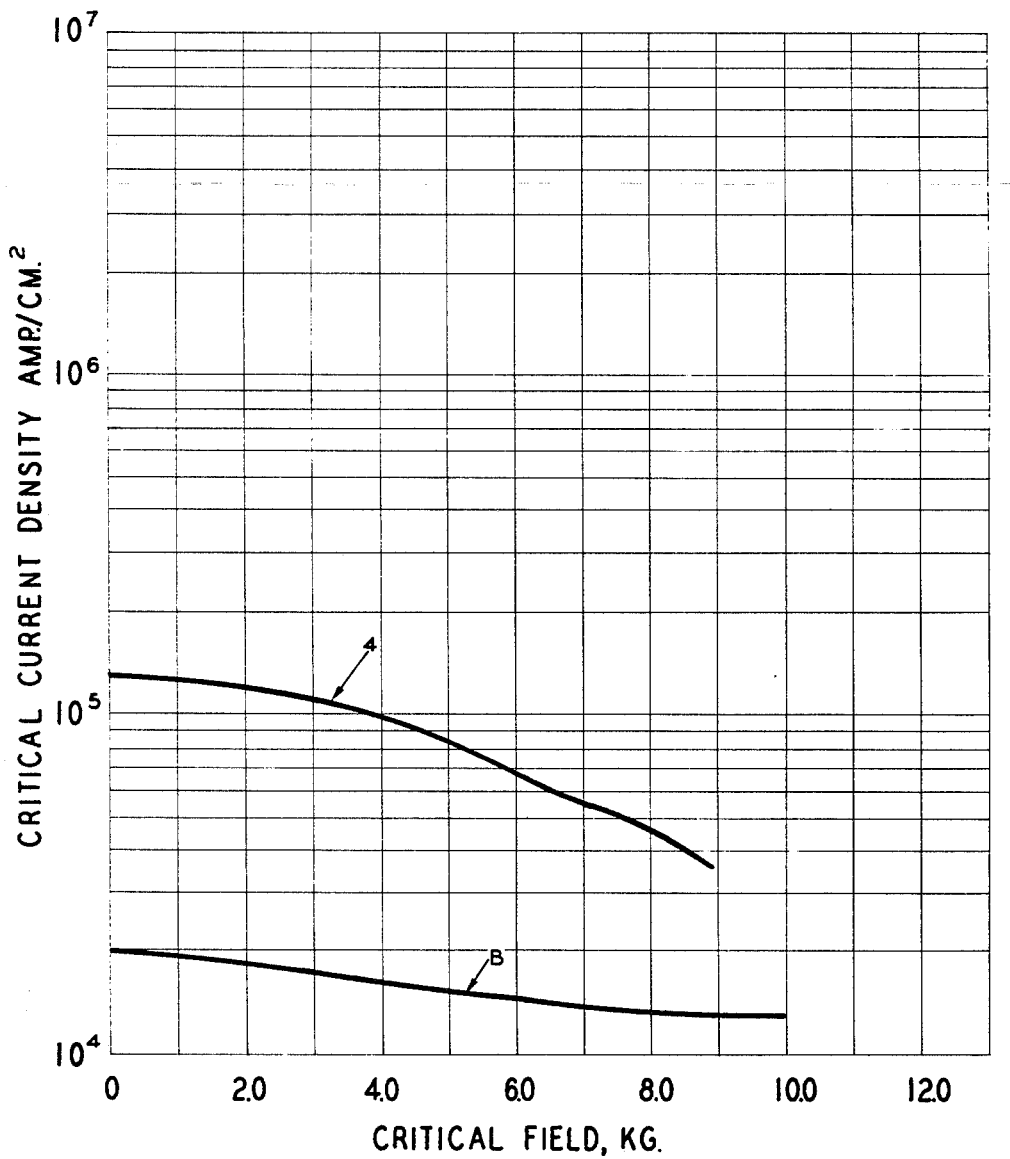
Figure 3:
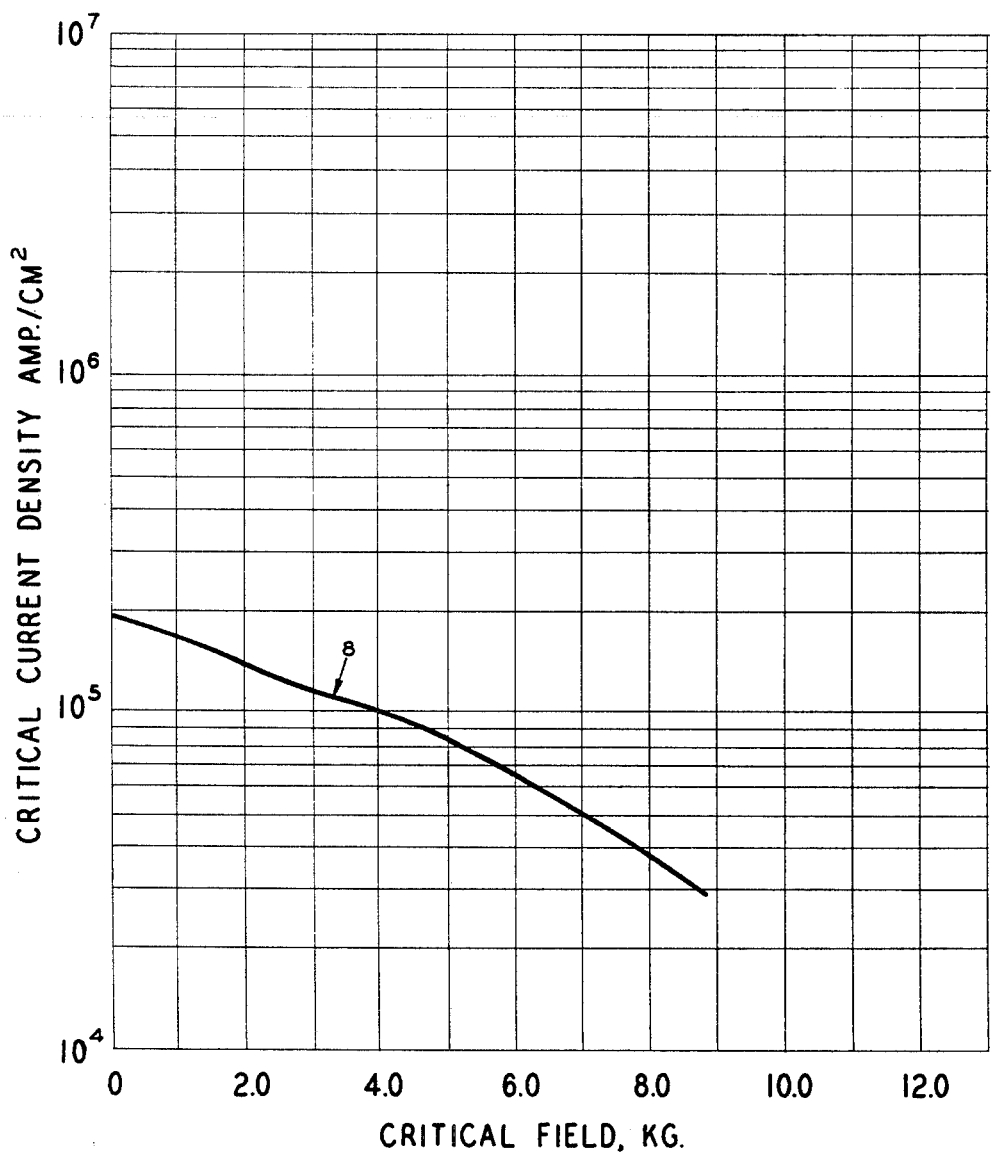
FIGURES 3 and 4 show the critical current behavior for lamellar structures containing, respectively, the superconducting β-tungsten intermetallic compounds of $Nb_3Al$ and $V_3Si$ after the heat treatments specified in Table I.
Figure 4:
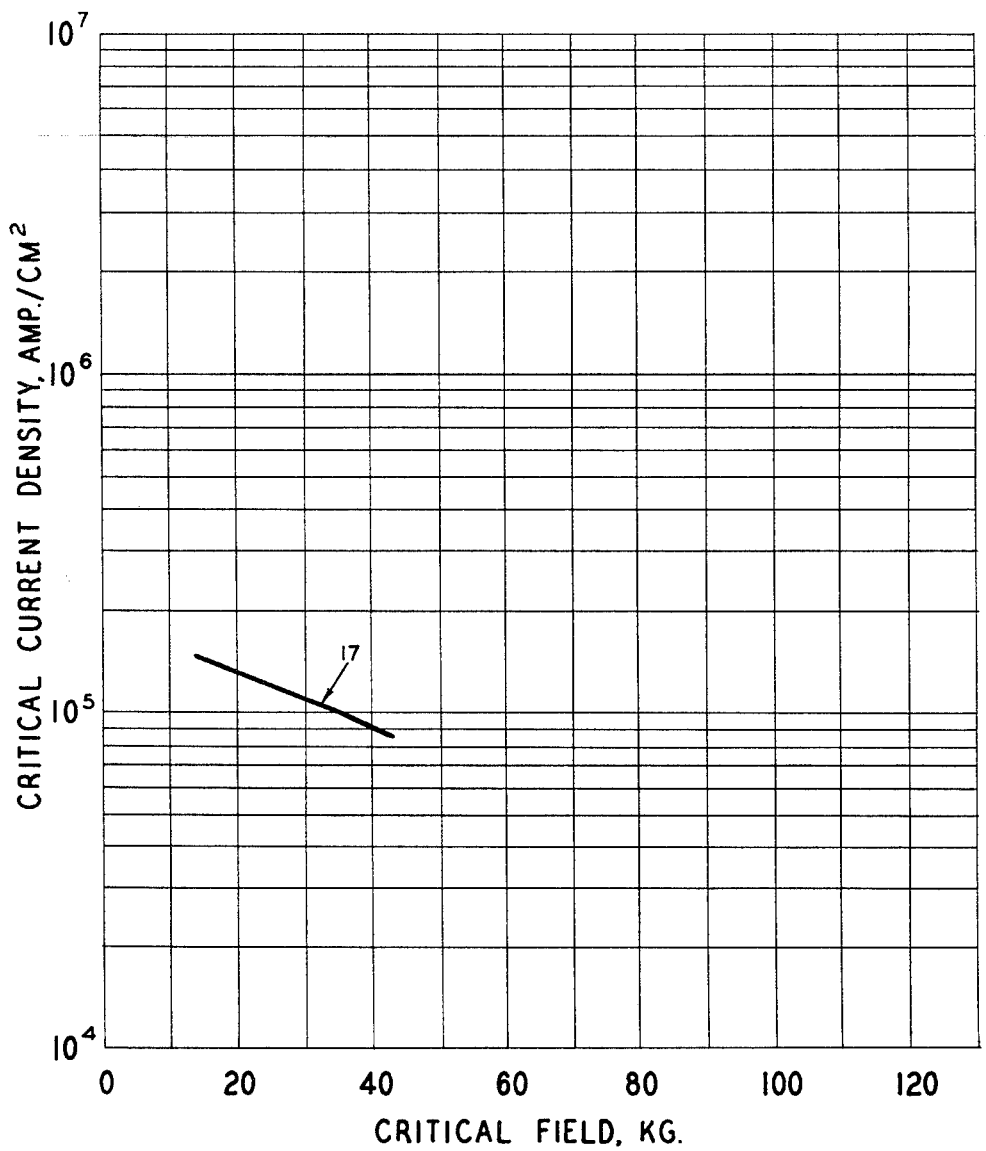
Figure 5:
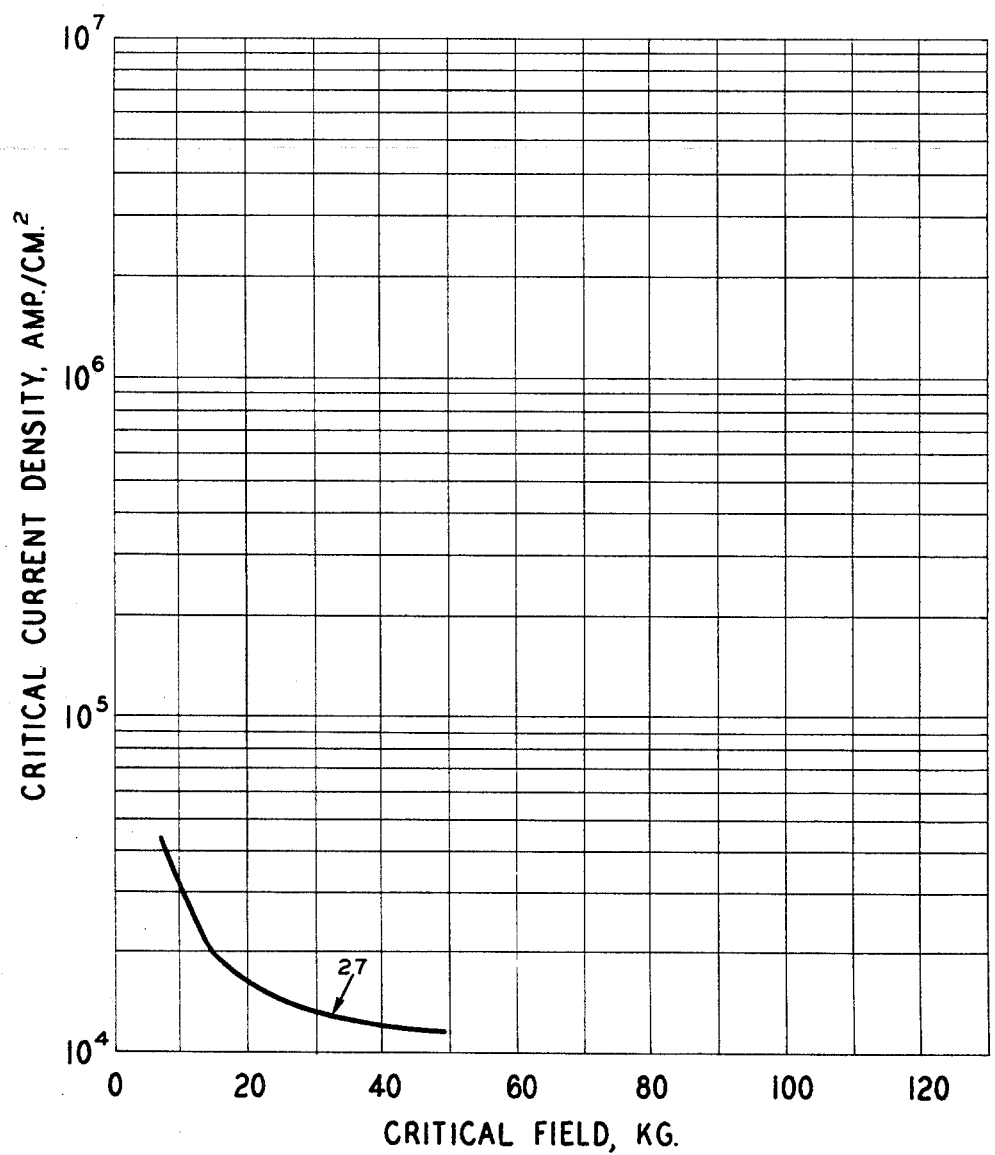
FIGURE 5 shows the critical current behavior for a lamellar structure containing a superconducting alloy composed of Nb-Zr-Sn after the heat treatment specified in Table I.
Figure 6:
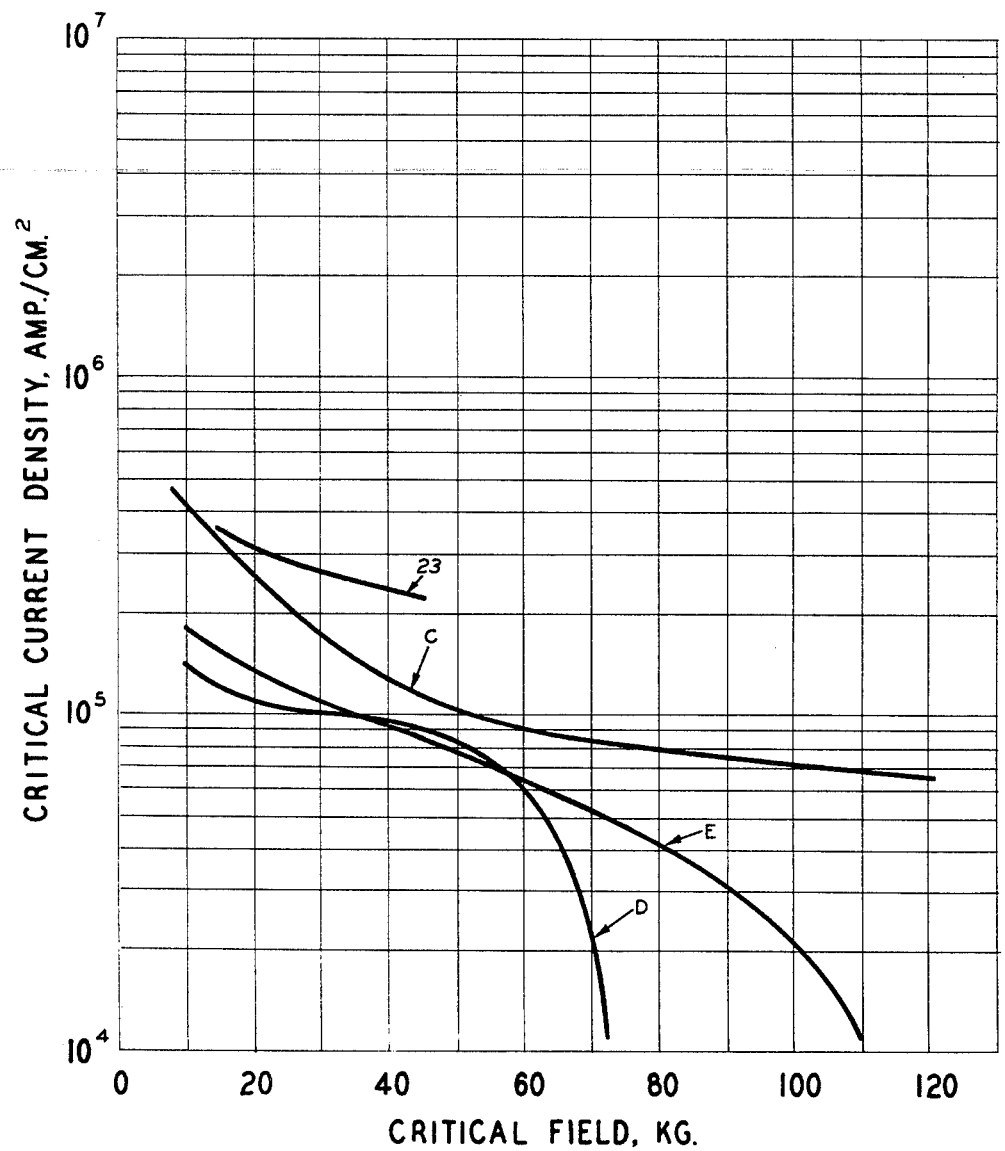
FIGURE 6 shows the critical current behavior for a lamellar structure containing the superconducting β-tungsten intermetallic compound, $Nb_3Sn$, after the heat treatment specified in Table I, curve 23, compared with typical critical current behavior reported for $Nb_3Sn$ wire, curve C, Nb–25% Zr, wire, curve D, and Nb–40% Ti wire, curve E.

To illustrate the utility of this invention a lamellar structure formed from niobium and tin powder particles was deposited on a 0.375 inch O.D. copper substrate to a thickness of 15 mils. The 15 mils thick lamellar structure was formed into a coil by machining a thread with a pitch of 24 threads per inch. The coil was then coated with a copper layer about 25 mils thick. The coil was then heat treated at 1000° C. for 2 hours to enhance the formation of $Nb_3Sn$ filaments. The cross-section of the threads in the coil (current conductor cross-section) was 400 mils².

The coil was placed in a suitable double-walled vacuum-insulated Dewar containing liquid helium, then subjected to an external magnetic field, and then subjected to an electric current designated as "transport current." Table II shows the results.

TABLE II

| Externally Applied Magnetic Field (K Gauss) | Critical Transport Current Passed Through Coil (Amperes) | Critical Current Density (Ampere per cm.²) |
| --- | --- | --- |
| 50 | 200 | $7.8 \times 10^4$ |
| 65 | 155 | $6.0 \times 10^4$ |
| 75 | 140 | $5.4 \times 10^4$ |
| 85 | 120 | $4.6 \times 10^4$ |
| 100 | 100 | $4.0 \times 10^4$ |

The comparative curves in the figures and the values listed in Tables I and II indicate the relatively high current densities that are attainable in lamellar structures produced according to this invention at relatively high magnetic fields. In general, the current-field characteristics of the lamellar structures of this invention are at least as good as have been attained on material produced by any other method, and usually are superior to the latter.

What is claimed is:

1. A method of forming a superconducting article having a lamellar structure composed of microscopic metallic particles bonded into interlocking relation with one another with the interface between bonded particles forming continuous filaments of metallic material having superconducting properties which comprises introducing a suitable powdered metallic material into a high velocity, high temperature gas stream to produce a high velocity stream of gas and heated particles; directing said gas and heated particle stream against the surface of a suitable base thereby depositing the so-heated particles on said base wherein the so-heated and deposited particles are bonded together in a lamellar structure and heat treating the bonded particles.

2. A process according to claim 1 wherein the metallic particles consist essentially of niobium and tin.

3. A process according to claim 1 wherein the metallic particles consist essentially of niobium and zirconium.

4. A process according to claim 1 wherein the metallic particles consist essentially of vanadium and silicon.

5. A process according to claim 1 wherein the metallic particles consist essentially of niobium and aluminum.

6. A process according to claim 1 wherein the metallic particles consist essentially of niobium.

7. A superconducting article formed according to the process of claim 1 which comprises a superconducting lamellar structure of microscopic metallic particles bonded into interlocking relation with one another with the interface between bonded particles forming continuous filaments of metallic material having superconducting properties.

References Cited

UNITED STATES PATENTS

| 3,114,826 | 12/1963 | Sullivan et al. | 117—93.1 |
| 3,215,569 | 11/1965 | Kneip et al. | 148—133 |
| 3,246,114 | 4/1966 | Matvay | 117—93.1 |
| 3,256,118 | 6/1966 | Speidel | 148—133 |
| 3,266,950 | 8/1966 | Zwicker | 148—133 |

RICHARD O. DEAN, *Primary Examiner.*